US006810031B1

(12) United States Patent
Hegde et al.

(10) Patent No.: US 6,810,031 B1
(45) Date of Patent: Oct. 26, 2004

(54) METHOD AND DEVICE FOR DISTRIBUTING BANDWIDTH

(75) Inventors: Manju Hegde, St. Louis, MO (US); Otto Andreas Schmid, St. Louis, MO (US); Jean Pierre Bordes, Chesterfield, MO (US); Xingguo Zhao, St. Louis, MO (US); Monier Maher, St. Louis, MO (US); Curtis Davis, St. Louis, MO (US)

(73) Assignee: Celox Networks, Inc., Hudson, MA (US)

( * ) Notice: Subject to any disclaimer, the term of this patent is extended or adjusted under 35 U.S.C. 154(b) by 0 days.

(21) Appl. No.: 09/515,028

(22) Filed: Feb. 29, 2000

(51) Int. Cl.$^7$ .............................................. H04L 12/28
(52) U.S. Cl. ..................................................... 370/351
(58) Field of Search ............................... 370/351, 258; 473/396–402, 236, 231–233, 229, 412; 710/29; 707/210; 711/148

(56) References Cited

U.S. PATENT DOCUMENTS

| | | | |
|---|---|---|---|
| 5,610,745 A | | 3/1997 | Bennett |
| 5,633,867 A | * | 5/1997 | Ben-Nun et al. ............ 370/399 |
| 5,825,748 A | * | 10/1998 | Barkey et al. ............... 370/236 |
| 5,917,820 A | | 6/1999 | Rekhter |
| 5,917,821 A | | 6/1999 | Gobuyan et al. |
| 5,917,822 A | | 6/1999 | Lyles et al. |
| 5,918,074 A | | 6/1999 | Wright et al. |
| 5,920,561 A | | 7/1999 | Daniel et al. |
| 5,926,459 A | | 7/1999 | Lyles et al. |
| 5,926,464 A | | 7/1999 | Fraser |
| 5,936,966 A | | 8/1999 | Ogawa et al. |
| 5,936,967 A | | 8/1999 | Baldwin et al. |
| 5,940,397 A | | 8/1999 | Gritton |
| 5,943,316 A | | 8/1999 | Davis |
| 5,943,319 A | | 8/1999 | Fraser |

(List continued on next page.)

FOREIGN PATENT DOCUMENTS

| | | |
|---|---|---|
| EP | 0531599 A1 | 3/1993 |
| EP | 0719065 A1 | 12/1994 |
| EP | 0680179 A1 | 11/1995 |
| EP | 0 817 431 A2 | 1/1998 |
| EP | 0 874 531 A2 | 10/1998 |
| EP | 0892575 A2 | 1/1999 |
| EP | 0944288 A2 | 9/1999 |
| EP | 0967756 A1 | 12/1999 |
| WO | WO 98/31127 | 7/1998 |
| WO | WO98/31127 | 7/1998 ......... H04L/12/413 |
| WO | WO99/26378 | 5/1999 |
| WO | WO99/53655 | 10/1999 |
| WO | WO 00/10297 | 2/2000 |

OTHER PUBLICATIONS

Coppo et al., *The A–VPN Server*: a Solution for ATM Virtual Private Networks*, IEEE: Singapore ICCS/'94, 1994, pp. 298–304.

H. Obara, *Optimum Architecture for Input Queuing ATM Switches*, Electronics Letters vol. 27, No. 7, pp. 555–557, Mar. 28, 1991.

(List continued on next page.)

*Primary Examiner*—Chi Pham
*Assistant Examiner*—Prenell Jones
(74) *Attorney, Agent, or Firm*—Wilmer Cutler Pickering Hale and Dorr LLP

(57) ABSTRACT

A method and device for controlling bandwidth distribution through a switch fabric is provided wherein a plurality of line cards and processor cards are connected through a switch fabric for parallel processing of transmission requests, along with the provision of transmission "credits" allowing for transmitting additional data bytes during a given cycle, which provides efficient and speedy bandwidth distribution, as well as resolution of output contentions. The processors maintain a credit balance which allows flexibility in granting transmission requests to accommodate transmission scheduling and "bursty" transmissions. Processors on both of the line cards and the processor cards normalize the data transmission requirements for both inputs and outputs connected by the switch fabric. Smoothing of data transmission is provided using a time-weighted buffer.

32 Claims, 8 Drawing Sheets

U.S. PATENT DOCUMENTS

| | | | |
|---|---|---|---|
| 5,943,481 | A | 8/1999 | Wakeland |
| 5,946,297 | A | 8/1999 | Calvignac et al. |
| 5,946,322 | A | 8/1999 | Moura et al. |
| 5,946,325 | A | 8/1999 | Shiota |
| 5,959,995 | A | 9/1999 | Wicki et al. |
| 5,959,996 | A | 9/1999 | Byers |
| 5,961,631 | A | 10/1999 | Devereux et al. |
| 5,968,128 | A | 10/1999 | Lauck et al. |
| 5,970,059 | A | 10/1999 | Ahopelto et al. |
| 5,978,356 | A | 11/1999 | Elwalid et al. |
| 5,982,748 | A | 11/1999 | Yin et al. |
| 5,987,031 | A | 11/1999 | Miller et al. |
| 5,987,035 | A | 11/1999 | Silva |
| 5,991,299 | A | 11/1999 | Radogna et al. |
| 5,991,817 | A | 11/1999 | Rowett et al. |
| 5,995,503 | A | 11/1999 | Crawley et al. |
| 5,999,518 | A * | 12/1999 | Nattkemper et al. ........ 370/258 |
| 6,011,775 | A | 1/2000 | Bonomi et al. |
| 6,011,779 | A | 1/2000 | Wills |
| 6,014,367 | A | 1/2000 | Joffe |
| 6,023,456 | A | 2/2000 | Chapman et al. |
| 6,028,842 | A | 2/2000 | Chapman et al. |
| 6,029,240 | A | 2/2000 | Blaner et al. |
| 6,032,190 | A | 2/2000 | Bremer et al. |
| 6,034,964 | A | 3/2000 | Fukushima et al. |
| 6,035,282 | A | 3/2000 | Tamai et al. |
| 6,091,731 | A * | 7/2000 | Biegaj et al. ............... 370/395 |
| 6,167,490 | A * | 12/2000 | Levy et al. ................. 711/148 |
| 6,233,240 | B1 * | 5/2001 | Barbas et al. ............... 370/395 |
| 6,343,067 | B1 * | 1/2002 | Drottar et al. .............. 370/231 |
| 6,442,571 | B1 * | 8/2002 | Haff et al. .................. 707/210 |
| 6,570,846 | B1 * | 5/2003 | Ryoo .......................... 370/229 |
| 6,622,182 | B1 * | 9/2003 | Miller et al. .................. 710/29 |

OTHER PUBLICATIONS

T. Anderson et al., *High–Speed Switch Scheduling for Local– Area Networks*; ACM Transactions on Computer Systems, vol. 11, No. 5, pp. 319–352, Nov. 1993.

T. Worster et al., *Buffering and Flow Control for Statistical Multiplexing in an ATM Switch*; ISS '95, XV International Switching Symposium vol. 1, pp. 273–277, Apr. 1995.

N. McKeown, *Scheduling Algorithms for Input–Queued Cell Switches*, Ph.D. Thesis, 114 pages, May 1995, University of California at Berkeley.

M.G. Ajmone Marsan et al., *RPA: A Simple, Efficient, and Flexible Policy for Input Buffered ATM Switches*, IEEE Communications Letters, vol. 1, No. 3, pp. 83–85, May 1997.

Chiussi et al, *The Atlanta Architecture and Chipset: A Low–Cost Scalable Solution for ATM Networking*, XVI World Telecom Congress Proceedings, Symposium on High Performance Interconnects, pp. 43–51, Aug. 21–23, 1997, Stanford University, Stanford, CA.

A. Mekkittikul and N. McKewon, *A Practical Scheduling Algorithm to Achieve 100*

Throughput in Input–Queued Switches, IEEE Infocom 98, vol. 2, pp. 792–799, Apr. 1998, San Francisco, CA.

N. McKeown and T. Anderson, *A Quantitative Comparison of Scheduling Algorithms for Input–Queued Switches*; Computer Networks and ISDN Systems, vol. 30, No. 24, pp. 2309–2326, Dec. 1998.

* cited by examiner

PPU#1 BW REQUEST INFORMATION

| CARD ID | PRIORITY BW REQUEST | NON-PRIORITY BW REQUEST |
|---|---|---|
| LINE CARD #1 | 500 | 500 |
| LINE CARD #2 | 100 | 100 |
| IPE #2 | 200 | 200 |
| IPE #4 | 400 | 400 |

FIG. 4

IPE 1 BW REQUEST INFORMATION

| CARD ID | PRIORITY BW REQUEST | NON-PRIORITY BW REQUEST |
|---|---|---|
| LINE CARD #1 | 800 | 800 |
| LINE CARD #2 | 600 | 600 |
| IPE #2 | 200 | 200 |
| IPE #4 | 300 | 300 |

FIG. 5

IPE#5 PRIORITY 1 BW ASSIGNMENT

| DESTINATION: IPE CARD #5, TOTAL BW = 1000 | | | | |
|---|---|---|---|---|
|  | PRIORITY | BW REQ. | BW ASSIGNED | LEFTOVER BW |
| IPE #1 | 1 | 100 | 100 | 1000-250=750 |
| IPE #2 | 1 | 60 | 60 | |
| IPE #3 | 1 | 50 | 50 | |
| IPE #4 | 1 | 40 | 40 | |
| IPE #1 | 2 | 100 | TBD | |
| IPE #2 | 2 | 400 | | |
| IPE #3 | 2 | 600 | | |
| IPE #4 | 2 | 100 | | |

FIG. 6

IPE#5 PRIORITY 2 BW ASSIGNMENT

| DESTINATION: IPE CARD #5, TOTAL BW = 1000 | | | |
|---|---|---|---|
| | PRIORITY | BW REQ. | BW ASSIGNED |
| IPE #1 | 1 | 100 | 100 |
| IPE #2 | 1 | 60 | 60 |
| IPE #3 | 1 | 50 | 50 |
| IPE #4 | 1 | 40 | 40 |
| IPE #1 | 2 | 100 | 750*100/1500=50 |
| IPE #2 | 2 | 400 | 750*400/1500=200 |
| IPE #3 | 2 | 600 | 750*600/1500=300 |
| IPE #4 | 2 | 400 | 750*400/1500=200 |

MAIN PROCEDURE OF BWNA

INPUT PORTS ACCEPTS GRANTS

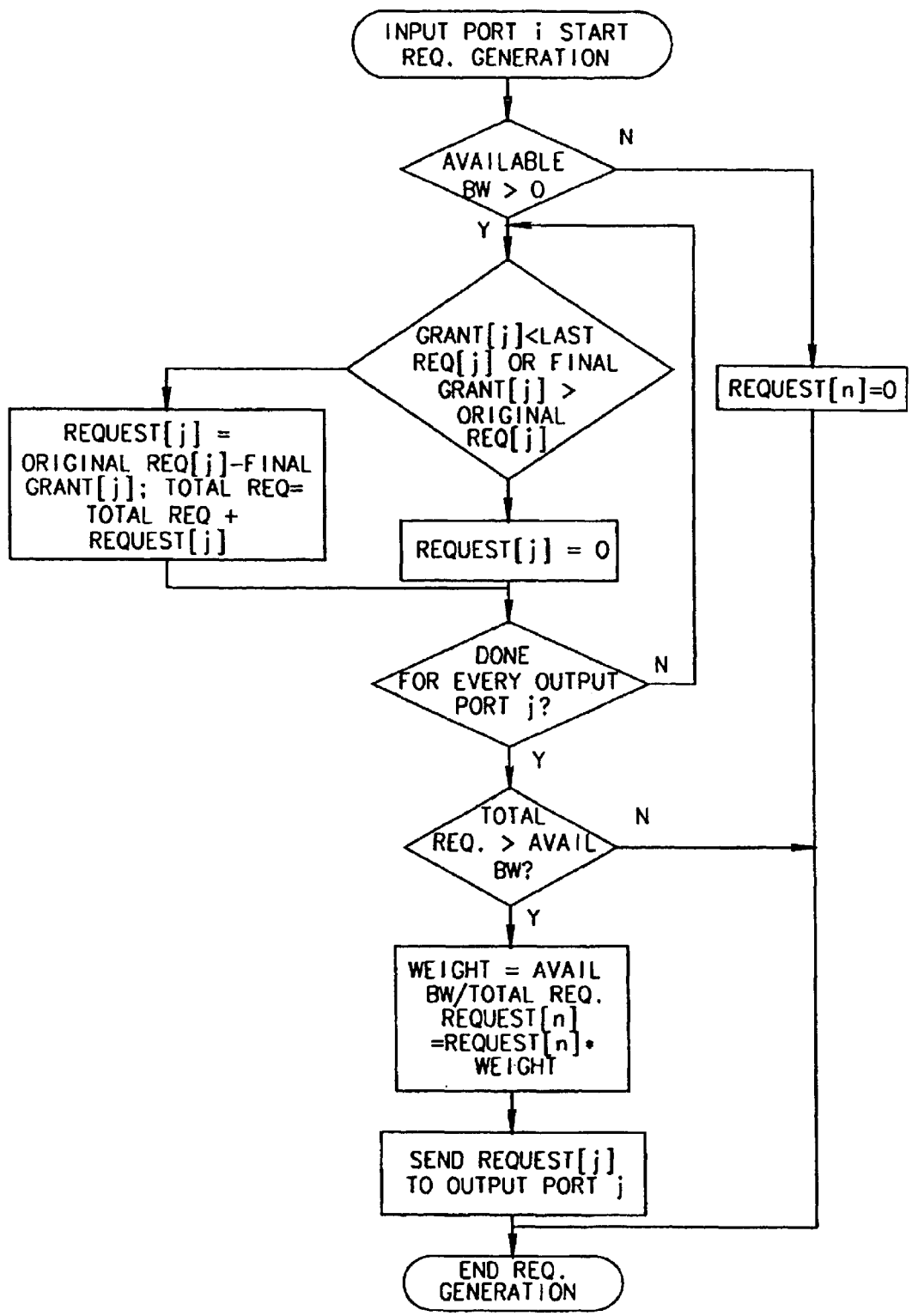
FIG. 10  INPUT PORTS GENERATES REQUESTS

METHOD AND DEVICE FOR DISTRIBUTING BANDWIDTH

FIELD OF THE INVENTION

The present invention relates to the field of high speed data packet processing for networking systems, and in particular to controlling bandwidth in networking systems which are characterized by high-speed switches that switch data packets having variable size and format requirements.

BACKGROUND OF THE INVENTION

In the field of networking systems, and in particular communication systems for the Internet, switch fabrics are used to direct data packets, for example, between different data packet processing modules. With the increasing speed in data transfer rates, improving efficiency and predictability of allocating and using bandwidth across switch fabrics of systems, such as routing devices, is increasingly crucial to maintaining the reliability of these devices at these high speeds. Such a need is particularly evident in data transfer over the Internet.

Historically, quality of service (QoS) on the Internet has been defined by a "best effort" approach. The "best effort" approach provides only one class of service to any connection, and all connections are handled with equal likelihood of experiencing congestion delays, with no priority assigned to any connection. With traditional Internet applications and transfer needs, this "best effort" approach was sufficient. However, new applications require significant bandwidth or reduced latencies. Bandwidth and latency are critical components of the QoS requirements specified for new applications. Bandwidth is the critical factor when large amounts of information must be transferred within a reasonable time period. Latency is the minimum time elapsed between requesting and receiving data and is important in real-time or interactive applications. In order to support these QoS guarantees through a network, it is essential that network nodes support such QoS.

Distribution of the available bandwidth across a switch fabric provides for trade-offs of bandwidth between different flows of data packets through a common switch fabric. This distribution permits the flexible allocation of QoS in accordance with the negotiated traffic contracts between users and service providers. Bandwidth distribution can affect the throughput performance of scheduling algorithms because such scheduling tries to match contracted throughput to the traffic arrival process. The ability to perform fast and reliable bandwidth distribution across the switch fabric permits the efficient utilization of the switch fabric bandwidth while maintaining rate guarantees to individual connections.

Known methods and schemes used to solve the problem of allocating bandwidth across a switch fabric were implemented through negotiation or through selective backpressure. In these known methods, bandwidth allocation is provided on a fixed length cell basis, and not on a more preferred variable length packet basis. For example, in these methods, each cell may be broadcast to output blocks which filter the cells and retain only those cells actually destined to the outputs comprising the block. The process is iterated down to the individual output port. This solution is similar to output buffering except that in this process, the "output" buffers are distributed throughout the switch fabric. As a result, the switch fabric can be made to be internally non-blocking with smaller speedup, and multicasting can be efficiently implemented. This implementation requires the replication of hardware in the form of switch fabric elements. The flow control needed to provide QoS is achieved by means of a Dynamic Bandwidth Allocation (DBA) protocol. In this protocol, at each input queue there is a virtual output queue associated with every input, with an explicit rate across the switching fabric which is negotiated between each input and output based on a set of thresholds which are maintained for each input queue. Each threshold is associated with a transmission rate from the input port into the switch fabric. In allocating these rates, the known method ensures that adequate bandwidth exists at the two points of contention: at the input link from the input buffer to the switch fabric, and at the output link, from the switch fabric to the output buffer. Real-time traffic bypasses the scheduling and is transported with priority across the switching fabric. The disadvantage in allocating bandwidth by this method is that the bandwidth is allocated in bursts which results in some loss of throughput.

In a known prior art device, the switch fabric consists of a non-blocking buffered Clos network. The middle stage module of the Clos network is not buffered in order to prevent sequencing problems of cells belonging to an individual connection. As a result, the modules need to schedule cells across the middle stage, with scheduling accomplished using a concurrent dispatching algorithm. Output buffering is emulated by utilizing selective backpressure across the switching fabric. However, the selective backpressure, combined with four levels of priority, in such a device provides a limited amount of flow control and cannot maintain guaranteed rates. The selective backpressure also complicates the multicasting function considerably.

In another known prior art system, high-bandwidth links implement a purely input buffered switch fabric with large throughput by using input scheduling based on the iSLIP-scheduling algorithm. The QoS provided by such a scheme is however limited.

Another known prior art system incorporates flow control by the use of statistical matching. In statistical matching, the matching process is initiated by the output ports, which generate a grant randomly to an input port based on the bandwidth reservation of that input port. Each input port receiving transfer grants selects one randomly by weighting the received grants by a probability distribution, which is computed by assuming that each output port distributes bandwidth independently based on the bandwidth reservation. However, matching is done on a cell-slot basis and the improvement in throughput achieved by statistical matching is limited.

Other prior art devices control data flow by means of the Weighted Probabilistic Iterative Matching(WPIM) algorithm. In WPIM, time is divided into cycles and credits are allocated to each input-output pair per cycle. The scheduling is then performed on a cell-slot basis by means of WPIM, with the additional feature that at each output port, when the credit of an input port is used up, its request is masked, making it more likely for the remaining input ports to be allocated in that particular slot. However, in WPIM, the computation of the credits does not take into account the outstanding credits, and is susceptible to large delays for traffic that is "bursty."

Some prior art methods provide data flow control using a Real-Time Adaptive Bandwidth Allocation (RABA) algorithm which provides multi-phase negotiation for cells over a time frame, with a frame-balancing mechanism that uses randomization over a frame in order to reduce contention between cells destined to the same output port. Cells are transmitted only after being scheduled, which results in a latency overhead. In addition, there is control and latency overhead in the negotiation.

Performing bandwidth distribution at high speeds while maintaining rates for a large number of flows on a cell-time basis is demanding and particularly difficult to manage in a node where variable length packets are being switched across a common switch fabric. To perform the bandwidth distribution using a cell-time basis at these high speeds would require expensive and complex hardware.

Therefore, what is needed is a method and device for scheduling bandwidth in cycles across a switch fabric at a packet processing node that maintains allocated bandwidth to individual users, that maintains allocated bandwidth to groups of users who share bandwidth, and that provides high levels of throughput across the switch fabric with controlled buffer occupancy and low latency. Additionally, a method and device is needed that provides for meeting required QoS in terms of rates, while accomplishing such scheduling in a scalable, distributed manner with an exchange of a minimal amount of control information in order to keep control overhead low.

SUMMARY OF THE INVENTION

In order to ease the processing requirements and to be able to perform bandwidth distribution flexibly, the present invention provides a method and device wherein the bandwidth requirements are aggregated and the distribution is performed over longer time units called cycles. This allows the algorithm time to complete required computations and maintain data traffic flow across a switch fabric. The scheduling of cycles also permits the allocation of fractions of cycles, which prevents starvation of individual connections, and reduces latency for individual connections by permitting trade-offs between high-priority and low-priority traffic. The invention provides bandwidth distribution based on requirements for active users. In order to ensure that the allocated bandwidth is matched to actual timely needs, the invention utilizes statistical multiplexing gain achieved through aggregation, as well as preemption, which allows allocated bandwidth to be reassigned. Further, a credit defined mechanism maintains memory of unfulfilled bandwidth requests. The credit mechanism permits a trade-off between traffic of higher priority and traffic of lower priority by maintaining a memory of unfulfilled requests. In order to reduce the latency associated with computations for normalization and allocation of bandwidth, the requests are broadcast once, and computations are performed locally. As a result, there is no need for time and bandwidth consuming iterative transmissions and retransmissions between the ports of the switch fabric. In order to simplify the computations, the allocation algorithm of the present invention uses repeated normalization. Further, in order to reduce the amount of information propagated, users are configured to processors in a particular manner.

Succinctly, the invention provides both a method and device for controlling bandwidth distribution. The method preferably provides controlling data traffic emanating from an input to a switch fabric, the data traffic being comprised of data bytes. The method preferably comprises the steps of determining an allowable number of data bytes for transmission during a cycle, maintaining a data byte transmission credit representing any extra number of data cell bytes also allowed to be transmitted during the cycle, transmitting during a subsequent cycle an actual number of data bytes, and updating the data byte transmission credit based on the difference between the actual number of data bytes transmitted and the allowable number. The may further comprise determining the average number of data bytes transmitted in previous cycles to thereby calculate a predicted number of data bytes for transmission in a future cycle.

The method may also includes determining a maximum allowable number of data bytes for transmission from the input during the cycle, the input comprising a plurality of inputs, and limiting the data bytes transmitted from the inputs to the maximum allowable number. The method may also include determining the maximum allowable number of data bytes for transmission to any one output during the cycle, and limiting the data bytes transmitted to the outputs to that number. The method may determine a priority level for data packets to be transmitted and first transmit data packets having a higher level priority than data packets having a lower level priority.

The method may further comprise limiting the transmission of data bytes by reducing, if necessary, the number of data bytes to be transmitted by each input on a proportional basis.

A preferable device for controlling the transmission of data packets through a switch fabric is provided, wherein the data packets are comprised of data cells having data bytes and the device includes a plurality of line cards and a plurality of processing cards, all of the cards having inputs connected to the switch fabric, with each of the cards comprising a plurality of processors configured for determining and controlling the transmission of an allowable number of data bytes from said inputs. The processors further comprise memory means for maintaining a credit balance representative of an allowable number of extra data bytes permitted to be transmitted from selected ones of the inputs during each cycle.

The device may also be provided wherein the processing cards are configured to determine an allowable number of data bytes for transmission for all cards during a cycle. The device may include buffers on the cards connected to the processors for storing the data packets during processing. The processors may also be configured to determine multiple levels of data packet priority for transmission, with higher priority packets being preferred for transmission before lower priority packets.

While the principal advantages and features of the present invention have been explained above, a more complete understanding of the invention may be attained by referring to the description of the preferred embodiment which follows.

BRIEF DESCRIPTION OF THE DRAWINGS

FIG. 4 is a table showing an example of the request information provided by the present invention;

FIG. 5 is a table showing an example of aggregated request information provided by the present invention;

FIG. 6 is a table showing an example of the bandwidth assignment provided by the present invention;

FIG. 10 is a flow chart of the method for generating an input request of the present invention;

DETAILED DESCRIPTION OF THE PREFERRED EMBODIMENTS

Figure 1:
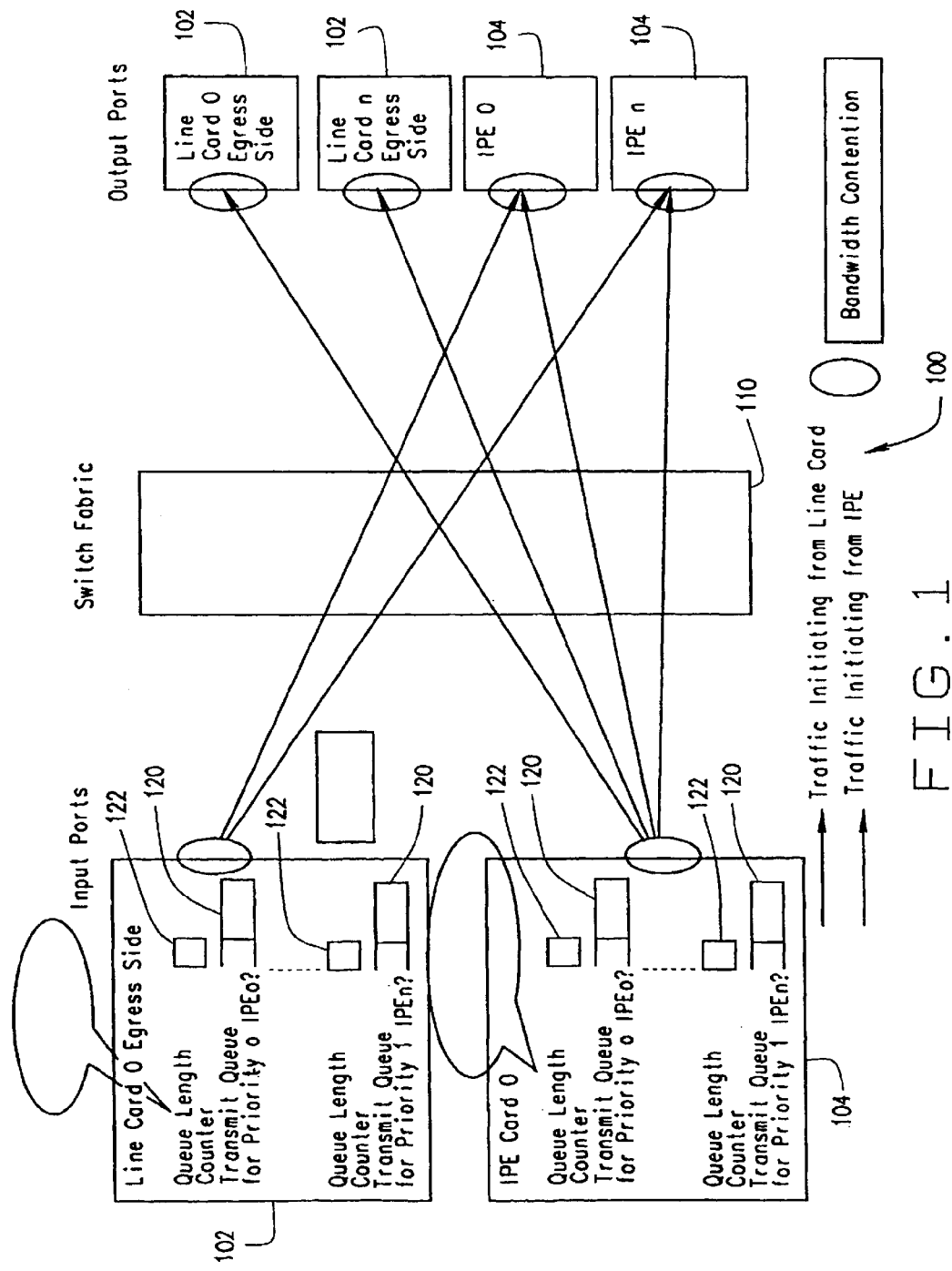
FIG. 1 is a schematic block diagram of a system illustrating bandwidth contention across a switch fabric.

A system 100 in which the preferred bandwidth distribution of the present invention may be implemented is shown in FIG. 1 and includes line cards 102 and Internet Protocol Engine (IPE) cards 104. The line cards 102 provide the physical interface to the transmission medium. The line cards 102 also examine the data traffic from various interfaces like asynchronous transfer mode (ATM), Gigabit Ethernet or Packet over Synchronous Optical Network (POS), and extract the relevant control information from the data packets, which the line cards 102 forward to the appropriate IPE cards 104. The IPE cards 104 provide protocol processing, manage users, support policing and traffic shaping, implement highly sophisticated QoS, with additional support for differentiated services, support distributed Bandwidth Management Processing (BWMP), and support distributed Logical Link Management.

The system 100 with the line cards 102 and IPE cards 104 may be provided, for example, as described in co-pending U.S. application entitled "Method and Device for Data Traffic Shaping" having serial no. and a filing date of Feb. 23, 2000, the disclosure of which is incorporated herein by reference. However, this is only one example of the system and types of interface and processing cards in which the present invention may be implemented. Any type of system with various interface and processing cards that provide for extracting and processing the relevant information from data packets may be used. Additionally, the system 100 as described is provided as an example of a system in which bandwidth distribution is needed to resolve output contentions.

Figure 2:
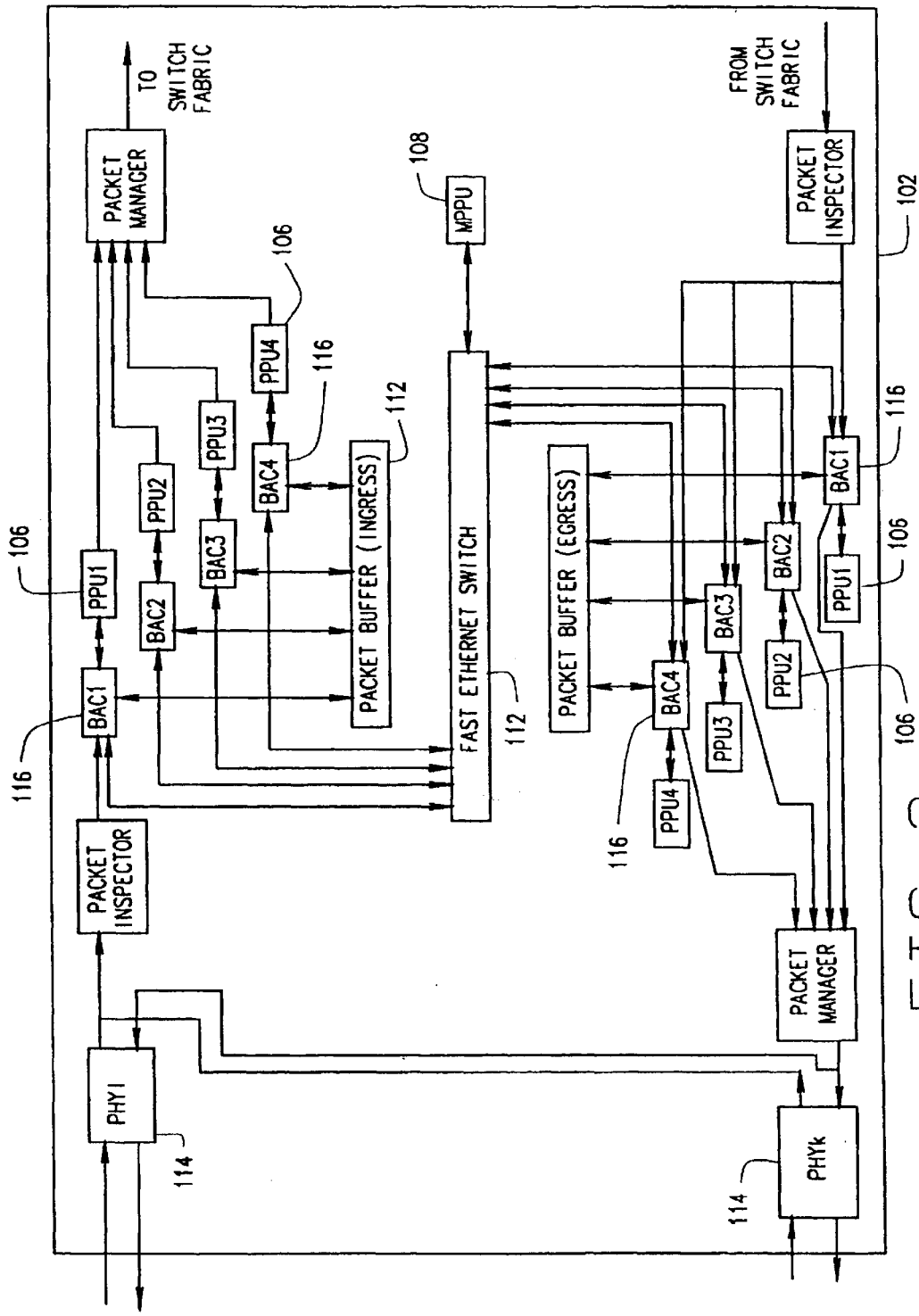
FIG. 2 is a schematic block diagram of a line card of the system of FIG. 1.
Figure 3:
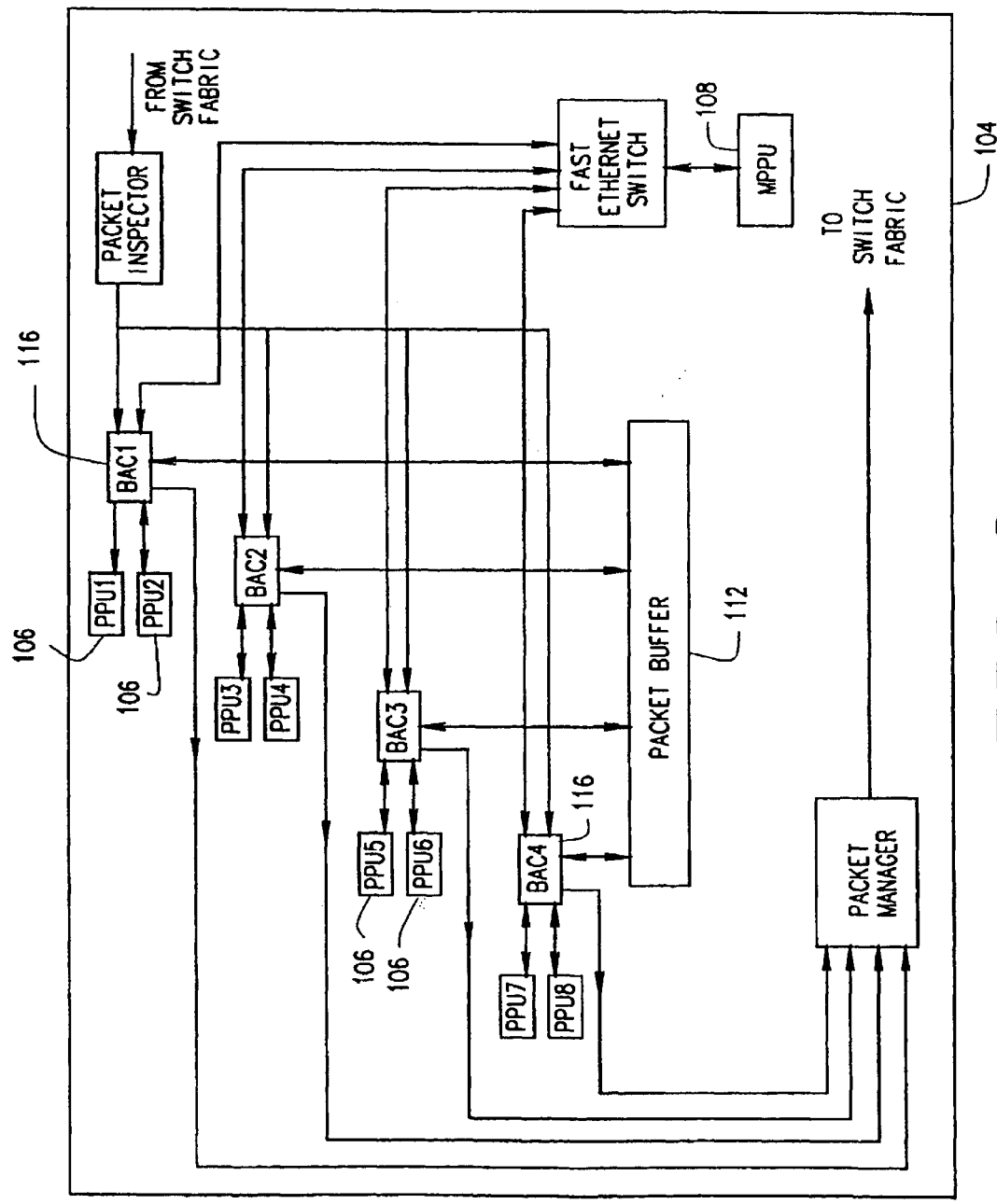
FIG. 3 is a schematic block diagram of an IPE card of the system of FIG. 1.

As shown in FIGS. 2 and 3, the preferred embodiment of both the line cards 102 and IPE cards 104 comprise several general-purpose processors (Protocol Processing Units (PPUs) 106). Each line card 102 and IPE card 104 also is preferably provided with a master processor, Master PPU (MPPU) 108. The MPPU 108 generally is provided to implement protocols and to conduct the supervision of PPUs 106 on that card. The MPPU 108 also provides bandwidth management within a card and aggregates the bandwidth needs of all the PPUs 106 on the card. These processors may be of various types and speeds depending upon the requirements of the system.

The line cards 102 together terminate the link protocol and distribute the received data packets based on user, tunnel or groups of user (logical link) information to a particular PPU 106 in a particular IPE card 104 through a switch fabric 110. If more bandwidth is needed than one PPU 106 is capable of processing, the data packets will be distributed over multiple PPUs 106. Thus, the system provides routed distribution.

The line cards 102 perform both ingress functions and egress functions. On the ingress side, the PPUs 106 perform routed distribution to the various PPUs 106 on the IPE cards 104. The data packets are then queued for the destined PPU 106 based on its requirements, and forwarded when it is eligible for service based on the distribution of switch fabric 110 bandwidth as determined by the present invention.

In order to accomplish the distribution of bandwidth, bandwidth requests are aggregated hierarchically across the switch fabric 110. The scheduled bandwidth is then redistributed hierarchically. Several kinds of flows can traverse the switch fabric 110. Flows traverse the switch fabric 110 from the ingress side to the egress side of the switch fabric 110, one or more times. The invention preferably considers all flows as two-point flows as shown in FIG. 1.

Credits of the present invention are temporary shortfalls between requested and allocated bandwidth, and are preferably maintained in memory until the shortfall is made up. The credits of the present invention allow for tradeoffs between different priorities, and reduce the exchange of information across the switch fabric 110.

Information about buffer occupancy for queues and Credits is exchanged between the various entities responsible for bandwidth distribution (i.e., the PPUs 106 and MPPUs 108 on the line cards 102 and IPE cards 106). Buffer Access Controllers (BACs) 116 provide for the exchange of this information between the PPUs 106, MPPUs 108 and packet buffers 112. Based on this information, distribution of bandwidth is allocated on a bytes per interval basis.

The present invention provides defined parameters for controlling data flow through the switch fabric 110. A CardID parameter is provided which is an eight bit number which uniquely identifies a line card 102 or IPE card 104 in the system 100. A cycle (C) is preferably a time unit (T) for bandwidth distribution, with bandwidth distribution performed at each cycle time instead of at each cell time. This provides for decreased overhead. Requests are provided such that all MPPUs 108 compute requests per flow (priority+line card 102 or IPE card 104) based on the requests received from each PPU 106. The request of the PPUs 106 are based on buffer occupancy per flow.

A buffer occupancy parameter is also provided at each PPU 106. For this parameter, a separate counter value is preferably maintained in each of the PPUs 106. Whenever a packet enters an ingress packet buffer 112, the corresponding counter is incremented. When data packets are scheduled to depart from the ingress packet buffer 112 based on grants received for the corresponding flow, the corresponding counter is decreased. A priority parameter preferably specifies the priority of the traffic. Priorities are strict, and therefore higher priority traffic is always granted before lower priority traffic. As will be described herein, these parameters are provided for use in each of the PPUs 106 and MPPUs 108 for the preferred bandwidth distribution.

Regarding the preferred bandwidth distribution of the present invention, the Bandwidth Distribution Protocol (BWDP) calculates the bandwidth requirement at each cycle C. Each cycle consists of the time required to transmit a determined number of bytes. Bandwidth contention across the switch fabric 110 results from the three kinds of traffic flows: line card 102 to IPE card 104, IPE card 104 to IPE card 104, and IPE card 104 to line card 102. Congestion of switch fabric bandwidth to one output port results from either bandwidth requests to an IPE card 104 (i.e., multiple line cards 102 and IPE cards 104 attempting to transmit data traffic to the same IPE card 104) or bandwidth requests to a line card 102 (i.e., multiple IPE cards 104 attempting to transmit data traffic to the same line card 102).

The BWDP algorithm is necessary to allocate bandwidth across the switch fabric 110 fairly among the two contending IPE cards 104. Coordination is needed among all entities transmitting into an output port at a given time so that their sum total does not exceed the output port bandwidth. If the sum total exceeds the total available bandwidth, the flows of data traffic should be scheduled accordingly. Thus, before transmitting any data packets into the switch fabric 110, all the transmitting entities (i.e., line cards 102 and IPE cards 104) must distribute the available bandwidth among each other. The BWDP of the present invention enables fast and efficient processing to provide data traffic flow control over the switch fabric 110.

Resource contention or congestion results when, for example, two IPE cards 104 want to send data traffic to the same line card 102. If there is no control of data transmission from the two IPE cards 104, the two IPE cards 104 will transmit data traffic simultaneously at a full transfer rate, for example 10 Gbps, for an arbitrary time. The switch fabric 110 which can only provide 10 Gbps line switching capability and limited buffering, is therefore unable to transmit 20 Gbps of data traffic to the line card 102. Thus, the data traffic will be "dropped" if the switch fabric buffer is full. So, as it should be apparent, the BWDP algorithm of the present invention is necessary to allocate bandwidth across the switch fabric 100 fairly among the two contending IPE cards 104. Thus, for example, the present invention provides that each IPE card 104 transmits at only 5 Gbps.

The BWDP of the present invention provides control of data traffic flow to resolve the output contentions. Generally, the BWDP of the invention provides control of the output contention as follows:

1. Divide the bandwidth requirements of an output port of a line card 102 or IPE card 104 fairly and efficiently among input ports;
2. Divide the bandwidth of the input ports fairly and efficiently among the output ports;
3. Satisfy priority bandwidth requirements before non-priority bandwidth requirements are considered.

The BWDP preferably provides inputs to the traffic schedulers at the line cards 104 or IPE cards 102, which schedulers in turn schedule the traffic.

With respect to the to the specific bandwidth distribution provided by the BWDP of the present invention, each PPU 106 of the IPE cards 104 is provided with a Credit variable for each PHY 114 and each IPE card 104 and each MPPU 108 of the line cards 102 is provided with a Credit variable for each IPE card 104. This Credit, which is preferably provided as a counter in the memory of the PPUs 106 or MPPUs 108, is updated based on the following rule: if the PPU 106 of the IPE card 104 or the MPPU 108 of the line card 102 transmits fewer bytes to the PHY 114 or IPE card 104 than assigned, the Credits for that specific card are increased (i.e., counter incremented) by the number of bytes not transmitted that were allowed to be transmitted. It should be noted that Credit is never allowed to accumulate more than a defined Credit Threshold, as is defined by the provider of the particular switching system. This Credit Threshold may be defined as necessary and is preferably based on historical data regarding transmission across the switch fabric 110, as well as the types of users transmitting data across the switch fabric 110. The Credit is preferably reset to a default value if no data traffic is provided for a certain IPE card 104 or line card 102 for a certain defined Credit Regeneration Duration.

When the PPU 106 of the IPE card 104 or the MPPU 108 of the line card 102 schedules traffic to a line card 102 or IPE card 104, it is allowed to transmit an extra amount of traffic to a card (draw-down), which must be less than or equal to the Credit for that particular card. In such a case the Credit will be correspondingly decreased (i.e., the counter will be decremented).

The Credit provided to the IPE cards 104 provides an important parameter in bandwidth management, and particularly for IPE card to IPE card traffic. For example, if IPE card-A 104 wants to send data to IPE card-B 104, then IPE card-A 104 requires bandwidth for transmission to the IPE card-B 104. IPE card-A 104 has a bandwidth request for transmission across the switch fabric 110, which will be the sum of the data bytes in its transmit queue 120 for transmission to IPE card-B 104 plus any draw-down. Thus, the total bandwidth request of IPE card-A 104 for bandwidth for transmission to IPE card B 104 equals an Accumulated Buffer Occupancy for IPE card-B 104 in IPE card-A 104, as defined herein, plus the Draw-down of IPE card-A 104.

In the preferred embodiment, during a first cycle after "system bootup," the Credits will be set to configured/default values. If for example the credit is set to 50 units, then in the initial bandwidth transmission request, the total amount of bandwidth requested will be the Draw-down plus the Accumulated Buffer Occupancy for IPE card-B 104 in IPE card-A 104, which is: 50 +0, or 50. In the preferred embodiment, one Credit equals one data byte.

The BWDP preferably performs the following at the beginning of each cycle:

1. A Bandwidth Request Accumulation procedure is performed in the line cards 102 and IPE cards 104.
2. The MPPU 108 on the line cards 102 multicast bandwidth requests to all the IPE cards 104.
3. The MPPU 108 on the IPE cards 104 multicast bandwidth requests to all the other IPE cards 104.
4. The MPPUs 108 of the IPE cards 104 computes bandwidth to each of the IPE cards 104 and line cards 102 using the BWDP.
5. The MPPUs 108 of the IPE cards 104 allocate bandwidth to the PPUs 106 of the IPE cards 104.
6. The MPPUs 108 of the line cards 102 allocate bandwidth to the PPUs 106 on the ingress side of the line cards 102.

Referring now to each of the steps, and in particular to the process of the PPUs 106 of the IPE cards 104 gathering and transmitting bandwidth request information, there is preferably logical transmit queues 120 in each of the PPUs 106 of the line cards 102 for each data stream flow as shown in FIG. 1. A queue length counter 122 in terms of data bytes is preferably provided for each queue 120. The queue 120 is managed preferably by a Traffic Policing Unit. The Traffic Policing Unit is provided to monitor incoming packets on a user basis and ensures that a user does not transmit data packets violating configured bandwidth and burst length parameters. To perform this function the Traffic Policing Unit maintains the following variables: a current time (CT) derived from a real-time counter and, on a per user basis, a theoretical arrival time (TAT) for each user, burst length (L) and bandwidth (B) in bytes per cycle. The Traffic Policing Unit performs the following calculation whenever a data packet is received for a user:

if CT<TAT−L then reject the data packet;
if TAT−L<=CT<=TAT then accept the data packet and update TAT as follows:
TAT=TAT+B/Packet Length;

if CT>TAT then accept the data packet and update TAT as follows:

TAT=CT+B/Packet Length.

The PPU 106 of the IPE card 104 calculates the bandwidth request information for each data flow based on the corresponding buffer occupancy for each data flow. This calculation is performed for both the non-priority and priority queue 120 in each of the cards as follows:

Accumulated Buffer Occupancy$_{Non\text{-}priority\ CardId}$= $\alpha$*Current Non-priority Buffer Occupancy$_{Non\text{-}priority\ CardID}$+ $(1-\alpha)$*Accumulated Buffer Occupancy$_{Non\text{-}priority\ CardId}$; and Accumulated Buffer Occupancy $_{Priority\ CardId}$=$\alpha$*Current Non-priority Buffer Occupancy$_{Priority\ CardId}$+$(1-\alpha)$ *Accumulated Buffer occupancy$_{Priority\ CardID}$ The variable a is preferably defined based on the desired amount of exponential smoothing of buffer occupancies.

The bandwidth request for each data flow is then determined as follows:

Bandwidth request$_{Non\text{-}priority\ CardId}$=Draw-down Request+Accumulated Buffer Occupancy$_{Non\text{-}priority\ CardId}$; and Bandwidth request$_{Priority\ CardId}$=Draw-down Request+ Accumulated Buffer Occupancy$_{Priority\ CardId}$ After the PPUs 106 of the IPE cards 104 gather the bandwidth request information, the request information is sent to its MPPUs 108. The preferred format for the control information is as follows:

1. Card ID
2. Bandwidth request information, which includes priority request information and bandwidth request information (i.e., non-priority).

An example of the request information that is generated by the PPUs 106 is shown in FIG. 4.

Next, the MPPUs 108 of the IPE cards 104 aggregate the bandwidth requests from the PPUs 106 of all the IPE cards 104 and multicast the bandwidth requests to the MPPUs 108 of all other IPE cards 104. Therefore, after an MPPU 108 of an IPE card 106 receives all the bandwidth request information from all its PPUs 106, it aggregates the bandwidth request information, then broadcasts the bandwidth request information to all other IPE cards 104. The MPPUs 108 of the IPE cards 106 use this bandwidth request information to allocate bandwidth among the line cards 102 and IPE cards 104 contending for the same IPE card's 104 bandwidth. The aggregation is just a simple adding of all the bandwidth requests for the same flow (i.e., to an output of a card) from each PPU 106. The preferred format for this control information is as follows:

1. Card ID
2. Bandwidth request information, which includes priority request information and bandwidth request information (i.e., non-priority).

An example of the aggregated request information that is generated is shown in FIG. 5.

The PPUs 106 of the line cards 102 then gather and transmit the bandwidth requests. There is preferably a transmit queue 120 for each data flow on the PPUs 106 on the ingress side of the line cards 102. The queue length counter 122 is preferably defined in bytes and maintained for each queue 120. The PPUs 106 of the line cards 102 calculate the bandwidth request information for each data flow based on the same algorithm as the PPUs 106 of the IPE cards 106.

After the PPUs 106 of the line cards 102 gather the bandwidth request information, the PPU's send the bandwidth request information to the MPPUs 108 on each of their line cards 102.

The MPPUs 108 of the line cards 102, after receiving all the bandwidth request information from all the PPUs 106 on its line card 102, then aggregate the bandwidth requests from all the PPUs 106. The MPPUs 108 of the line cards 102 will broadcast the bandwidth request information to all the MPPUs 108 on all the IPE cards 104. The MPPUs 108 on the IPE cards 104 use this bandwidth request information to allocate bandwidth among the line cards 102 and IPE cards 104 contending for the same IPE card's 104 bandwidth. Again, this aggregation is just a simple adding up of the bandwidth request for the same data flows as provided from each of the PPUs 106. The preferred format for this control information is as follows:

1. Card ID
2. Bandwidth request information, which includes priority request information and bandwidth request information (i.e., non-priority).

After an MPPU 108 of an IPE card 104 receives all of the bandwidth request information, each MPPU 108 of the each IPE card 104 executes an iterative normalization algorithm (BWNA) to allocate bandwidth between the ports of the IPE cards 104 and line cards 102. Then each MPPU 108 of each IPE card 104 transmits the bandwidth allocation back to the line card 102 if the line card 102 is designated to receive information regarding the bandwidth allocation from the particular IPE card 104. It should be noted that each IPE card 104 may provide bandwidth to more than one line card 102.

The preferred BWNA algorithm is defined as follows:

```
// run the BWNA algorithm for different priority BW
   allocation, starts from the highest //priority
for priority k from Highest to Lowest //assume k is the
   highest priority //generate request for every input port
for input_port_number i from 0 to n-1 //n is the total
   number of input ports
Call input_port_generate_request(input port I, priority k)

if all requests are zero
   continue for the next priority

//generate grant from every output port
for output_port_number j from 0 to m-1 //m is the total
   number of output ports Call output_port_generate_grant(output port j, priority k)

if all grants are zero
   continue for the next priority

//accept grant for every input port
for input_port_number i from 0 to n-1 //n is the total
   number of input ports Call input_port_accept_grant(input port I, priority k)

if no grants are accepted
   continue for the next priority
```

The procedure input_port_generate_request(input port number, priority) generates requests to each output port.

The procedure output_port_generate_grant(input port number, priority) generates a grant of bandwidth to each input port;

```
int input_port_gen_request(int i) {
  if (v_input_port_avail_BW[i]<EPSILON) {
    for (int j=0; j<n; j++)
      m_norm_request[i][j]=0;
    return 0;

}
  double total_request=0;
  for (int j=0; j<n; j++){
    if (m_grant[i][j]<m_norm_request[i][j]||
        m_final_grant[i][j]>=m_original_request[i][j]-
        EPSILON) {
      // No request to this output port; grant from this output
        port is final
      m_norm_request[i][j]=0;
    }
    else {
      // prepare to normalize
      m_norm_request[i][j]=m_original_request[i][j]-
m_final_grant[i][j];
      total_request+=m_norm_request[i][j];
    }
  } if (total_request<EPSILON){ // maxtrix is all 0
    //The grants are final
    //the input port drops out the contention return 0;
  }
  else if (total_request>v_input_port_avail_BW[i]) {
//need to normalize
    double weight=v_input_port_avail_BW[i]/total_
      request;
    for (int j=0; j<n; j++){
      m_norm_request[i][j]*=weight;
    }
  } return 1;
} int output_port_gen_grant(int j) {
  if (v_output_port_avail_BW[j]<EPSILON) {
    for (int i=0; i<n; i++)
      m_grant[i][j]=0;
    return 0;
  } double total_request=0;
  for (int i=0; i<n; i++) {//every input port
    total_request+=m_norm_request[i][j];
  }

// Allocate available BW to requests
  if (total_request>v_output_port_avail_BW[j]) {
    double weight=v_output_port_avail_BW[j]/total_
      request;
    for (int i=0; i<n; i++)
      m_grant[i][j]=m_norm_request[i][j]*weight;
    v_output_port_avail_BW[j]=0;
  }
  else {
    for (int i=0; i<n; i++)
      m_grant[i][j]=m_norm_request[i][j];
    v_output_port_avail_BW[j]-=total_request;
  } return 1;
} void input_port_accept_grant(int i) {
  //Sum up the assigned BW
  double total_grant=0;
  for (int j=0; j<n; j++)
    total_grant+=m_grant[i][j];
  //Update available BW:
  v_input_port_avail_BW[i]-=total_grant;

//Update grantted BW:
  for (int j=0; j<n; j++)
    m_final_grant[i][j]+=m_grant[i][j];
}
```

The procedure input_port_accept_grant (input port number, priority) provides for the input ports to accept the grant from the output port.

Figures 7, 8:
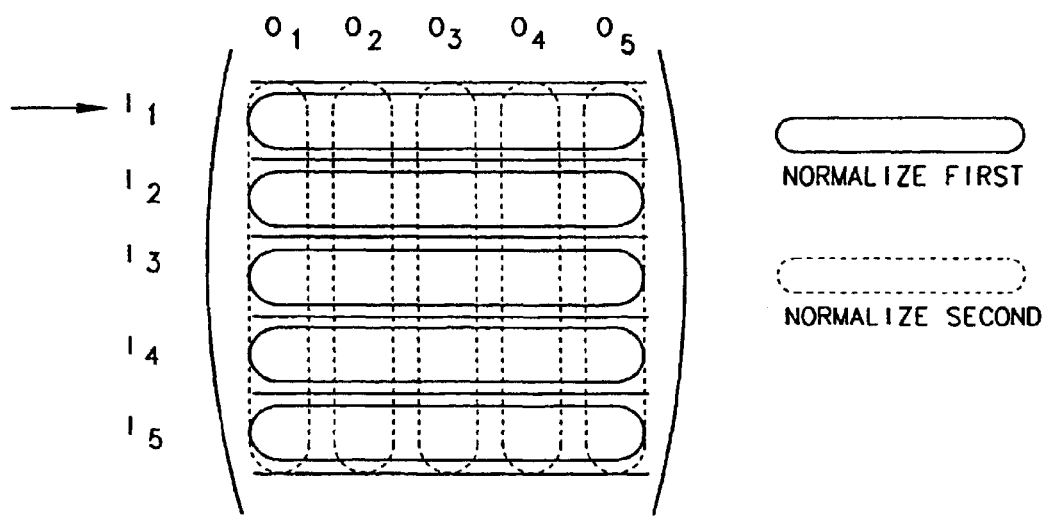
FIG. 7 is a table showing an example of the bandwidth assignment of FIG. 6 after an additional bandwidth allocation assignment is executed as provided by the present invention.
FIG. 8 is a table illustrating a normalization process of the present invention.

The bandwidth transmission rate determined by the present invention is preferably first normalized for each input (i.e., proportionately distributed for each input based on its request), and then normalized for each output (proportionately distributed for each output) as shown in FIG. 8. This is an iterative process, which attempts to provide maximum transmission across the switch fabric 110 at each cycle, is provided by the BWNA. Note that if the receive buffer gets congested which can be inferred from the buffer occupancy, then the grants to that output port can be reduced by reducing the available bandwidth to that port, i.e., reducing v_output_port_avail_BW in BWNA.

Shown in FIG. 6 is an example of the sharing of bandwidth of a particular IPE card 104, IPE card #5 104, which serves as an output port among four requesting IPE cards 104 serving as input ports. For this example, suppose that the bandwidth has two priorities, with priority 1 higher than priority 2, then bandwidth sharing according to the BWDP preferably occurs as follows: the bandwidth of IPE card #5 104 is first divided among the IPE cards 104 for the highest priority bandwidth (priority 1), as shown in FIG. 6; then the bandwidth used for priority 1 is deducted from the total bandwidth available. If the remaining bandwidth is not zero, it will be divided among the IPE cards 104 again, proportionately to the requests for the priority 2 bandwidth, as shown in FIG. 7.

Therefore, for example, as shown in FIG. 7, IPE card #1 is assigned or granted 100 units of priority 1 bandwidth and 50 units of priority 2 bandwidth.

Once the bandwidth allocation for the IPE cards 104 is determined, the MPPUS 108 of the IPE cards 104 will divide this bandwidth among PPUs 106 of the IPE cards 104 based on the particular PPU's 106 request. For example, if there are again two priorities of bandwidth, with priority 1 higher than priority 2, then each MPPU 108 will allocate bandwidth to the PPUs 106 on its card as follows:

1. Aggregate the bandwidth request for a particular data flow from all the PPUs 106;
2. The Priority 1 bandwidth for a particular flow allocated to the MPPU 108 of the IPE card 104 is divided among its PPUs 106. The division is proportional to the bandwidth request of the PPU 106 for that particular flow;

3. The Priority 2 bandwidth for a particular flow allocated to the MPPU 108 of the IPE card 104 is divided among its PPUs 106. The division is proportional to the bandwidth request of the PPU 106 for that particular flow; and
4. The bandwidth assignment information is transmitted back to each PPU 106.

The preferred format for this control information is as follows:
 1. Card ID
 2. Priority, bandwidth assigned After the PPU 106 receives this control information from the MPPU 108, it will transmit it to the scheduler in the PPU 106 which will use this control information (which is preferably a number) to send out packets to the line cards 104 and the IPE cards 104. It should be noted that the allocation of bandwidth information from the MPPU 108 to the PPUs 106 of the line cards 102 is performed in the same manner as the MPPUs 108 of the IPE cards 104, when allocating bandwidth to the PPUs 106 of the IPE cards 104.

It should be noted that the bandwidth distribution calculations as defined herein are preformed on all the IPE cards 104. This reduces the amount of bandwidth required for such calculation by reducing the amount of inter-card transmissions required for the calculations. Further, the normalization process provides for maximizing transfer rate from inputs to outputs and the Credits provide that scheduling is not delayed. Finally, because a buffer is provided in the preferred switch fabric 110 of the present invention, bandwidth distribution is provided at cycle times, and not at cell times. This further, provides for the efficient and speedy bandwidth distribution of the present invention.

Figure 9:
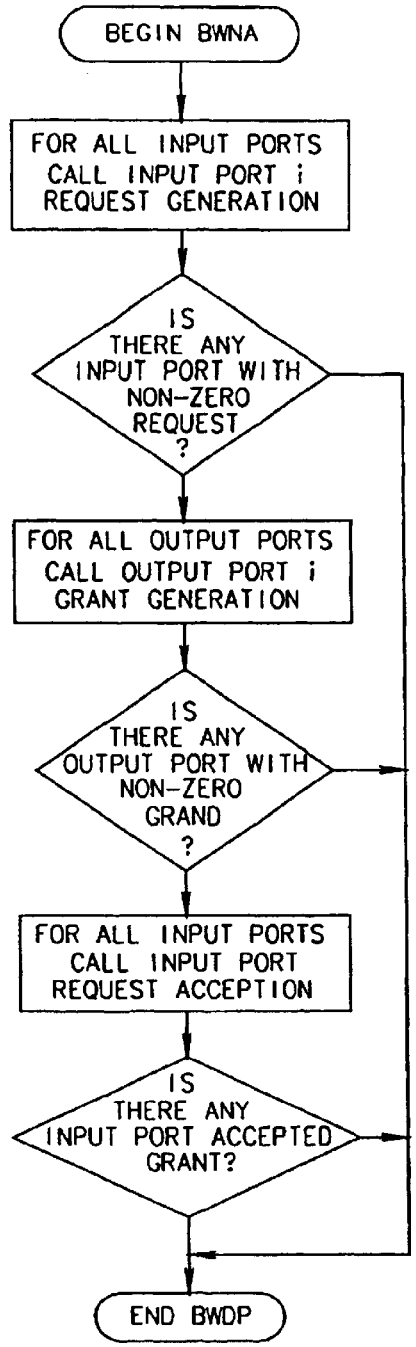
FIG. 9 is a flow chart of the bandwidth distribution method of the present invention.
Figure 12:
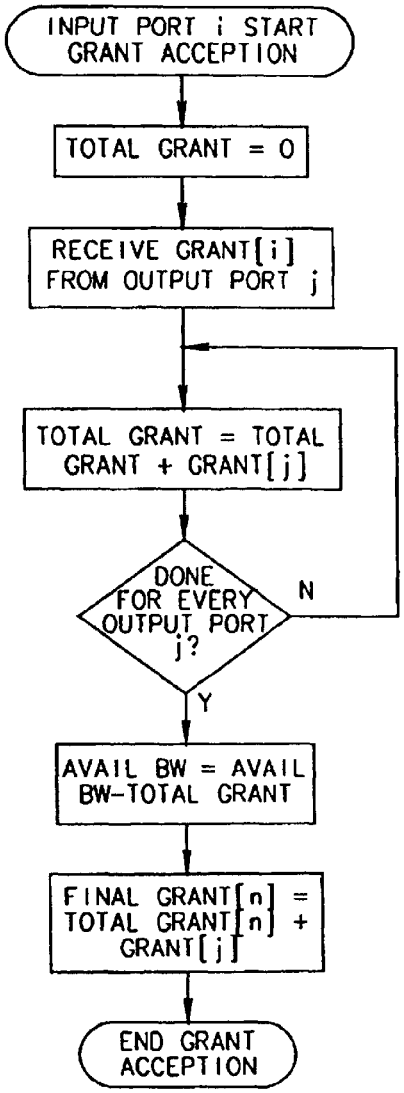
FIG. 12 is a flow chart of the method for accepting a grant as implemented by the present invention.
Figure 11:
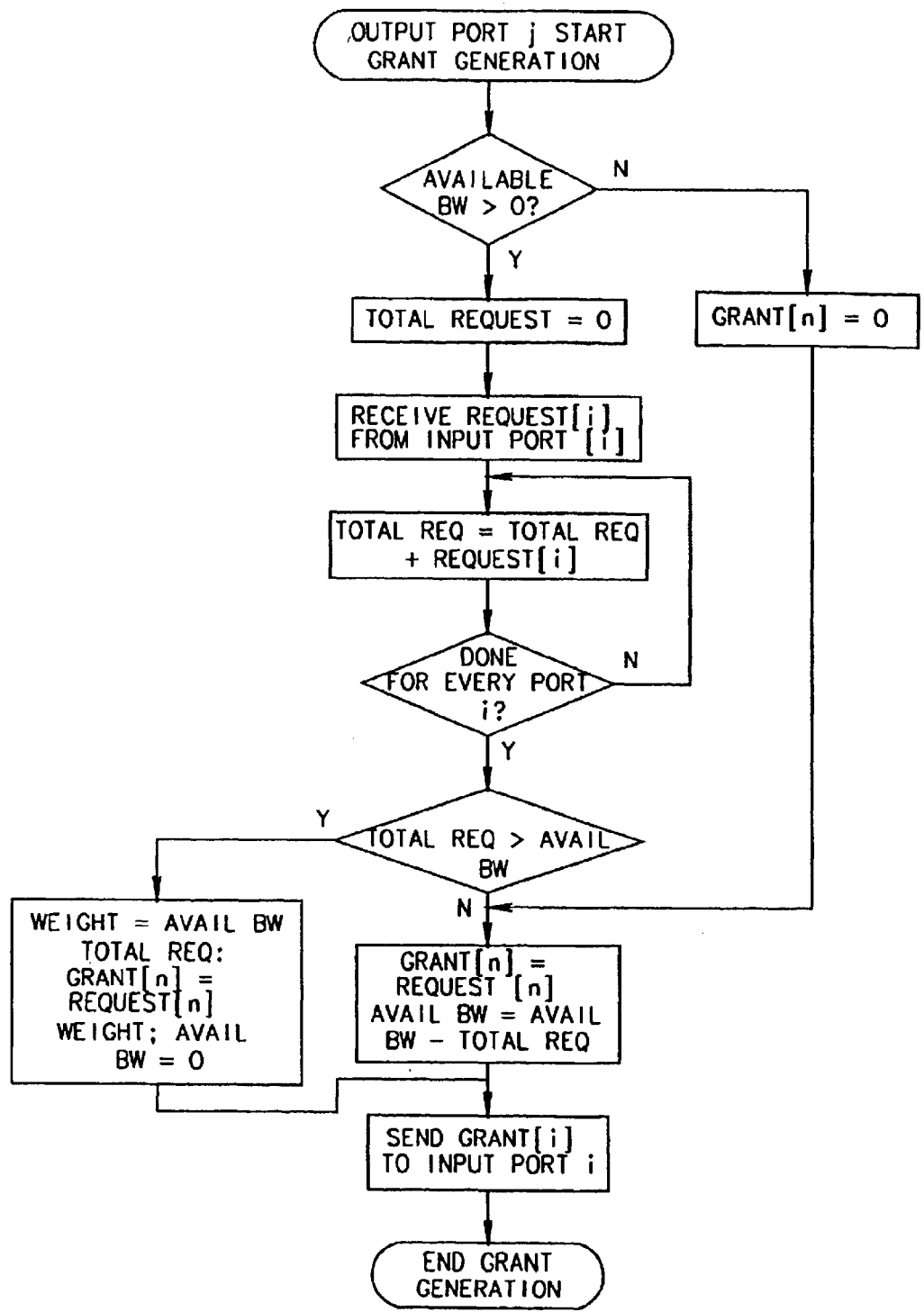
FIG. 11 is a flow chart of the method for generating an output grant of the present invention.

The overall procedure provided by the BWNA of the present invention is shown in FIG. 9, with the procedures for generating input port requests and output port grants, shown in FIGS. 10 and 11, respectively. Additionally, FIG. 11 shows the procedure for generating output grants.

In the preferred embodiment of the present invention, bandwidth distribution software modules are provided on the different processors of the different cards to perform different functions for the bandwidth distribution.

The bandwidth distribution software module on the MPPUs 108 of the IPE cards 104 preferably provides the following functions: (1) receive bandwidth request information from the PPUs 106 of its corresponding IPE card 104 and process the bandwidth request information; (2) broadcast the bandwidth request information to the MPPUs 108 on all the IPE cards 104; (3) receive Buffer Occupancy Information from the line cards 102; (4) receive bandwidth allocation information from the MPPUs 108 of all the IPE cards 104; (5) allocate bandwidth to its PPUs 106 and line cards 102; and (6) transmit the bandwidth allocation information to the PPUs 106 and the line cards 102.

The bandwidth distribution software module on the PPUs 106 of the IPE cards 104 preferably provides the following functions: (1) gather bandwidth request information; (2) transmit the bandwidth request information to the MPPU 108 of its corresponding IPE card 108; (3) receive bandwidth allocation information from the MPPU 108 of its corresponding IPE card 108; and (4) transfer the bandwidth allocation information to the corresponding scheduler.

The bandwidth distribution software module on the MPPUs 108 of the line cards 104 preferably provides the following functions: (1) receive bandwidth request information from the PPU 106 of its corresponding IPE card 104 and process the bandwidth request information; (2) multicast the bandwidth request information to all the MPPUs 108 of all the IPE cards 104; (3) receive bandwidth allocation information from the MPPUs 108 of the IPE cards 104; and (4) allocate the bandwidth to PPUs 104 of the line cards 102.

The bandwidth distribution software module on the PPUs 106 of the line cards 102 preferably provides the following functions: (1) gather bandwidth request information; (2) transmit the bandwidth request information to the MPPU 108 of its corresponding line card 102; (3) receive bandwidth allocation information from the MPPU 108 of its corresponding line card; and (4) transfer the bandwidth allocation information to the corresponding scheduler.

Additionally, the line card PPU bandwidth distribution software preferably transmits bandwidth information to the Traffic Scheduler. Also, the IPE card PPU bandwidth distribution software preferably transmits bandwidth allocation information to the Traffic Scheduler.

Provided below as Exhibit A is a program in the C programming language for simulating the execution and performance of the BWNA. Specific code programmed into the PPUs 106 and MPPUs 108 will implement the functions illustrated by the C simulation program. However, the specific programmed code may be varied and modified to satisfy the transmission requirements of the data traffic crossing the switch fabric. The specific programmed code and any modifications should be apparent to one skilled in the art.

The bandwidth distribution of the present invention provides high speed processing of data traffic across a switch fabric, such that the efficiency and predictability of allocating and using the bandwidth across the switch fabric is greatly increased. However, it should be understood by one skilled in the art that the bandwidth distribution of the present invention, including software and hardware implementations, may be configured in alternate ways, and is not limited by the number of component parts and code as described in the preferred embodiments. For example, with respect to hardware components, the number of line cards 102 and IPE cards 104 may be scaled depending upon the switch fabric requirements. Also, the number of PPUs 106 and MPPUs 108 may be scaled as needed, as well as the type and speed of these processors. Additionally, the number of queue 120 may be scaled to accommodate additional priority levels of data packets. With respect to the software components and parameters, the queue length counter 122, the Credit Threshold, the cycle length and time, and the priority and buffer parameters may all be modified. These software and hardware modifications would merely require minor programming changes and would not require any significant hardware changes.

Although the bandwidth distributor of the present invention has been described in detail only in the context of controlling bandwidth through a switch fabric, for example through a router, the invention disclosed herein may also be readily configured to control bandwidth between various type of inputs and outputs that may have data traffic flow contentions.

Additionally, regarding the hardware implementation of the invention, several of the functions could be incorporated into a custom chip.

There are other various changes and modifications which may be made to the particular embodiments of the invention described herein, as recognized by those skilled in the art. However, such changes and modifications of the invention may be implemented without departing from the scope of the invention. Thus, the invention should be limited only by the scope of the claims appended hereto, and their equivalents.

What is claimed is:

1. A method of controlling data traffic emanating from an input to a switch fabric, the data traffic being comprised of data packets, said packets including data bytes, the method comprising the steps of determining an allowable number (A) of data bytes for transmission during a cycle;

maintaining a data byte transmission credit (C) representing any extra number of data bytes also allowed to be transmitted during the cycle;

transmitting during a subsequent cycle an actual number of data bytes up to A+C; and updating the data byte transmission credit based on the difference between the actual number of data bytes transmitted and A.

2. The method of claim 1 wherein said input comprises a buffer, and wherein the stop of determining A further comprises determining the average number of data bytes stored in said buffer in previous cycles to thereby calculate a predicted number of data bytes for transmission in a future cycle.

3. The method of claim 2 wherein said input comprises a plurality of inputs, and further comprising the step of determining a maximum allowable number (D) of data bytes for transmission from said plurality of inputs during the cycle, and limiting said data bytes transmitted form said inputs to D.

4. The method of claim 3 further comprising a plurality of outputs connected to said switch fabric and wherein the step of transmitting data bytes comprises determining the maximum allowable number (E) of data bytes for transmission to any one output during the cycle, and limiting said data bytes transmitted to said outputs to E.

5. The method of claim 4 further comprising the step of determining a priority level for each data packet to be transmitted.

6. The method of claim 5 wherein the stop of transmitting data bytes further comprises first transmitting data bytes from data packets having a higher level priority than data bytes from data packets having a lower level priority.

7. The method of claim 6 wherein the step of limiting the transmission of data bytes includes reducing, if necessary, the number of data bytes to be transmitted by each input on a proportional basis.

8. A method of controlling the traffic flow of data packets between data input ports having data cell buffers and data output ports, the data packets including data cells comprising data bytes, and the data cell buffers storing the data cells, the method comprising the steps of:

determining the number of data bytes in each data cell buffer during a cycle;

determining a maximum allowable data byte transmission credit (TCL) for transmitting extra data bytes from the data cell buffers of each data input port to the data output ports during the cycle, said extra data bytes being in addition to an assigned allowable number (AN) of data bytes for transmission during the cycle;

during the cycle, requesting an AN equal to the number of data bytes in the data cell buffer plus the difference between TCL and a current credit balance (CL);

processing the data transmission request to determine AN, said AN being eligible for use during the cycle or for credit to CL;

transmitting during a subsequent cycle a total number of data bytes from each data cell buffer to the data output ports equal to no more than AN plus CL; and updating CL by the difference between AN less the total number of data bytes transmitted during the cycle.

9. The method of claim 8 wherein the step of determining the number of data bytes to request for AN further comprises determining the average number of data bytes in each data cell buffer in previous cycles and calculating a predicted number of data bytes for transmission from the data cell buffer to the output ports.

10. The method of claim 9 wherein the step of determining the number of data bytes to request for AN further comprises determining a weighted average of the number of data bytes transmitted in previous cycles to thereby calculate a predicted number of data bytes for transmission in a future cycle.

11. The method of claim 10 wherein the step of transmitting data bytes comprises determining the maximum allowable number (M) of data bytes for transmission to any one output port during the cycle, and limited said data bytes transmitted to said output ports to M.

12. The method of claim 11 further comprising the step of determining the maximum allowable number (MA) of data bytes for transmission from said data input ports during the cycle, and limiting said data bytes transmitted form said input ports to MA.

13. The method of claim 12 further comprising determining a priority level for each data byte to be transmitted.

14. The method of claim 13 wherein the step of transmitting data bytes further comprises first transmitting data bytes having a higher level priority than data bytes having a lower level priority.

15. The method according to claim 14 wherein the step of limiting the transmission of data bytes includes reducing, if necessary, the number of data bytes to be transmitted by each input port on a proportional basis.

16. A device for controlling the transmission of data packets through a switch fabric, said data packets comprised of data cells having data bytes, said device including a plurality of line cards and a plurality of processing cards, all of said cards having inputs connected to the switch fabric, each of said cards comprising a plurality of processors configured for determining and controlling the transmission of an allowable number of data bytes from said inputs, and said processors further comprising memory means for maintaining a credit balance representative of an allowable number of extra data bytes permitted to be transmitted from said inputs during each cycle.

17. The device of claim 16 wherein each of the processing cards are configured to determine an allowable number of data bytes for transmission for all cards during a cycle.

18. The device of claim 17 wherein each of the cards further comprises a buffer connected to the processors for storing the data packets during processing.

19. The device of claim 18 wherein the processors are configured to determine multiple levels of data packet priority for transmission, higher priority packets being preferred for transmission before lower priority packets.

20. A method of controlling data traffic through a switch fabric, said data traffic being comprised of data packets having data cells of data bytes, the method the method comprising the steps of requesting the transmission of a number of data bytes for a given cycle;

determining an allowed number of data bytes for transmission during the given cycle;

maintaining a memory balance of available extra data byte transmission possibilities;

transmitting during a subsequent cycle a total number of data bytes including the allowed number of data bytes plus any additional data bytes awaiting transmission to the extent said data bytes to be transmitted is less than the allowed number of data bytes and the memory balance;

updating the memory balance.

21. The method of claim 20 wherein the step of maintaining the memory balance comprises maintaining memory balance for each of a plurality of inputs.

22. The method of claim 21 wherein the step of determining the allowed number of data bytes further comprises determining a weighted average of the number of data bytes requested for transmission in previous cycles to determine a predicted number of bytes for a current transmission request.

23. The method of claim 22 wherein the step of transmitting a total number of data bytes further comprises transmitting during each cycle no more than a maximum allowed number of data bytes in a data flow path between an input and an output, the maximum allowed number of data bytes being determined by the transmission limits of each input.

24. The method of claim 22 wherein the step of transmitting a total number of data bytes further comprises transmitting during each cycle no more than a maximum allowed number of data bytes in a data flow path between an input and an output, the maximum allowed number of data bytes being determined by the transmission limits of each output.

25. A method of determining an allowable number of data bytes to be transmitted during any cycle from a plurality of inputs to a plurality of outputs over a assigning an allowable number of data bytes to be transmitted by each input corresponding to a request and a credit balance, and switch fabric, said method comprising the steps of:

updating the credit balance in accordance with any difference between the number of data bytes actually transmitted and the allowable number.

26. The method of claim 25 wherein said data bytes are associated into data cells of varying length, and further comprising determining a cycle time.

27. The method of claim 26 wherein the cycle time is preselected to be of a length greater than the time required to process any individual data cell.

28. The method of claim 27 wherein the step of assigning an allowable number includes the step of determining an expected number of data bytes to be received at each output, and limiting the number of data bytes to be transmitted to any output to be within an allowable limit.

29. A device for controlling the transmission of data packets through a switch fabric, said device comprising a plurality of line cards and a plurality of processing cards, all of said cards having inputs connected to the switch fabric, each of said cards comprising a plurality of processors configured for determining an allowable number of data bytes to be transmitted by each input corresponding to a request for transmission of data bytes and a credit balance representative of an allowable number of extra data bytes permitted to be transmitted from selected ones of said inputs, and said processors further comprising memory means configured for maintaining the credit balance, the processors further configured to update the credit balance in accordance with any difference between the number of data bytes actually transmitted and the allowable number.

30. A device for controlling data traffic through a switch fabric, said data packets comprised of data cells having data bytes, the device including a plurality of processing cards, all of said cards having inputs connected to said switch fabric, each of said cards comprising a plurality of processors for determining and assigning the transmission of an allowable number of data bytes form said inputs and for updating a credit balance representative of an allowable number of extra data bytes permitted lo be transmitted from selected ones of said inputs.

31. The device of claim 30 wherein said data bytes are associated into data cells of varying length, and wherein each of the processing cards transmits the allowable number of data bytes at each of a cycle time, said cycle time having a determined duration.

32. The device of claim 31 wherein all of said cards are comprised of outputs connected to said switch fabric and wherein the processors are configured for determining an expected number of data bytes to be received at each output, and limiting the number of data bytes transmitted to any output to be within an allowable limit.

* * * * *